United States Patent [19]

Saito et al.

[11] Patent Number: 5,693,397
[45] Date of Patent: Dec. 2, 1997

[54] MAGNETIC RECORDING MEDIUM HAVING A MAGNETIC LAYER CONTAINING HEXAGONAL FERRITE MAGNETIC PARTICLES AND SPECIFIED HC, HK AND HC/HK

[75] Inventors: Shinji Saito; Nobuo Yamazaki; Hitoshi Noguchi, all of Kanagawa, Japan

[73] Assignee: Fuji Photo Film Co., Ltd., Kanagawa, Japan

[21] Appl. No.: 581,338

[22] Filed: Dec. 29, 1995

[30] Foreign Application Priority Data

Jan. 10, 1995 [JP] Japan ................. 7-017412

[51] Int. Cl.$^6$ ......................... G11B 5/706
[52] U.S. Cl. .............. 428/65.3; 428/329; 428/336; 428/694 BH; 428/900
[58] Field of Search ................. 428/329, 336, 428/694 BH, 900, 65.3

[56] References Cited

U.S. PATENT DOCUMENTS

| | | | |
|---|---|---|---|
| 4,778,734 | 10/1988 | Ohdan et al. | 428/694 |
| 5,075,169 | 12/1991 | Nagai et al. | 428/402 |
| 5,079,092 | 1/1992 | Maekawa et al. | 428/403 |
| 5,114,801 | 5/1992 | Aoki et al. | 428/694 |
| 5,118,575 | 6/1992 | Maekawa et al. | 428/403 |
| 5,258,223 | 11/1993 | Inaba et al. | 428/323 |
| 5,384,175 | 1/1995 | Kojima et al. | 428/64 |
| 5,503,911 | 4/1996 | Aoki et al. | 428/213 |

*Primary Examiner*—Stevan A. Resan
*Attorney, Agent, or Firm*—Sughrue, Mion, Zinn, Macpeak & Seas, PLLC

[57] ABSTRACT

A disk-form magnetic recording medium is described, comprising a nonmagnetic support having provided thereon at least one magnetic layer comprising a binder and hexagonal ferrite magnetic particles dispersed therein, wherein the magnetic layer has an in-plane coercive force Hc of 1,200 to 3,000 Oe, an anisotropy field $H_k$ of more than 3000 Oe, an Hc/Hk ratio of 0.25 or higher, an in-plane orientation ratio of 0.8 or higher, and a vertical-direction squareness ratio calculated through diamagnetic correction of lower than 0.6.

3 Claims, No Drawings

MAGNETIC RECORDING MEDIUM HAVING A MAGNETIC LAYER CONTAINING HEXAGONAL FERRITE MAGNETIC PARTICLES AND SPECIFIED HC, HK AND HC/HK

FIELD OF THE INVENTION

The present invention relates to a magnetic recording medium for high-density recording which has a magnetic layer containing hexagonal ferrite magnetic particles.

BACKGROUND OF THE INVENTION

Conventional magnetic recording media which was widely used, such as video tapes, audio tapes, and magnetic disks, comprise a nonmagnetic support having provided thereon a magnetic layer comprising ferromagnetic iron oxide, Co-modified ferromagnetic iron oxide, $CrO_2$, ferromagnetic metal, or hexagonal ferrite dispersed in a binder. Of these, hexagonal ferrite is known as a material having excellent suitability for high-density recording. Examples of magnetic recording media using hexagonal ferrite magnetic particles are enumerated below.

JP-A-60-157719 discloses a magnetic recording medium having a magnetic layer which contains magnetic particles having a particle diameter of 0.1 to 0.3 µm and has a vertical-direction squareness ratio of 0.7 or more and a surface roughness of 0.05 µm or less (the term "JP-A" as used herein means an "unexamined published Japanese patent application"). JP-A-60-157719 is intended to provide a magnetic recording medium for high-density recording which has a sufficiently high vertical-direction squareness ratio and excellent surface smoothness.

JP-A-62-109226 discloses a magnetic recording medium comprising a support having provided thereon a magnetic layer which has a thickness of 1.8 µm or less, contains platy magnetic particles having an average particle diameter of 0.2 µm or less and an average aspect ratio of flatness of 6 or more, and has a specific vertical-direction squareness ratio and a specific vertical-direction coercive force. JP-A-62-109226 is intended to provide a magnetic recording medium which has excellent running durability during use and satisfactory suitability for overwriting and attains high recording density and high output.

JP-A-64-89022 discloses a magnetic recording medium which uses a binder having a saturation magnetization of 60 emu/g or more, a specific surface area by BET method of 25 to 70 m²/g, an average particle diameter of 0.01 to 0.2 µm, and a coercive force of 400 to 2,000 Oe (oersted), and containing a polar group in an amount of $1\times10^{-5}$ eq/g or more. JP-A-64-89022 is intended to improve reproduced output and attain a high C/N ratio and improved running durability.

JP-A-3-280215 discloses a magnetic recording medium in which the longitudinal-direction coercive force is from 1,000 to 4,000 Oe and the residual magnetization in the longitudinal direction is higher than that in the vertical direction, which in turn is higher than that in the in-plane width direction. JP-A-3-280215 is intended to provide a magnetic recording medium for high-density recording which has a satisfactory balance between long-wavelength output and short-wavelength output.

JP-A-5-40370 discloses a magnetic recording medium in which 100 parts by weight of magnetic particles having a specific surface area of 23 to 45 m²/g and a coercive force of 400 to 2,000 Oe are dispersed in from 10 to 40 parts by weight of a resin binder. JP-A-5-40370 is intended to provide a magnetic recording medium for high-density recording which is reduced in noise and has excellent orientation.

JP-A-5-12650 discloses a magnetic recording medium which comprises a support, a magnetic layer containing hexagonal ferrite and having a thickness of 0.1 to 0.6 µm, and a nonmagnetic layer provided between the magnetic layer and the support and having a larger thickness than the magnetic layer. JP-A-5-12650 is intended to improve surface properties, short-wavelength output, erasion characteristics, and durability.

JP-A-5-225547 discloses a magnetic recording medium comprising a nonmagnetic support, a nonmagnetic layer provided thereon, and a magnetic layer provided on the nonmagnetic layer and containing magnetic particles having a diameter of 0.1 µm or less. JP-A-5-225547 is intended to provide a magnetic recording medium having excellent high-frequency electromagnetic characteristics, satisfactory suitability for signal overwriting, and good durability.

JP-A-3-286420 and *IEEE. Trans. Mag.*, Vol. 24, No. 6, November 1988, p. 2850 disclose that electromagnetic characteristics of a magnetic recording medium containing hexagonal ferrite are influenced by the anisotropic magnetic field Hk of the ferrite. The former reference discloses a magnetic recording medium which has two magnetic layers provided on a nonmagnetic layer and in which the lower magnetic layer has an axis of easy magnetization in the longitudinal direction and the upper magnetic layer contains magnetic particles having an anisotropic magnetic field of 3,000 Oe or less. JP-A-3-286420 is intended to provide a magnetic recording medium which attains high output over a wide range from a long-wavelength region to a short-wavelength region.

Furthermore, a large number of inventions concerning squareness ratio SQ in magnetic recording media employing a hexagonal-ferrite magnetic material are disclosed in, e.g., JP-A-60-164925 and JP-A-3-49025. Specifically, JP-A-60-164925 disclose a magnetic recording medium which has a magnetic layer containing a magnetic material with a particle diameter of 0.03 to 0.10 µm and is made suitable for high-density recording by regulating the magnetic layer so as to have a longitudinal-direction squareness ratio of 0.6 or higher. JP-A-3-49025 disclose a magnetic recording medium which is made excellent in recording-wavelength output and C/N in high-density recording by using a magnetic material with a particle diameter of 300 to 700 Å and a particle diameter/particle thickness ratio of 1 to 5 and regulating the dHc/Hc ratio, calculated from Hc and the half width (dHc) of the differential curve obtained from a saturation magnetization hysteresis loop at around H=Hc, to 0.5 or lower and the squareness ratio in the head-running direction to 0.7 or higher.

Moreover, JP-A-5-120675 discloses a magnetic recording disk which is made excellent in running durability and suitability for overwriting at a high recording density by regulating the magnetic-layer thickness to 5 µm or smaller and the orientation ratio of ferromagnetic particles to 0.85 or higher.

However, the above-described recording media employing hexagonal ferrite described have failed to fully exhibit their performances although effective in some degree. There has been much room for an improvement in output, especially in the ultrashort-wavelength region (usually, recording wavelengths of 0.5 µm and shorter), but conditions under which such improvement is attained have been unable to be found.

For example, the medium proposed in JP-A-3-286420, which has an Hk of 3,000 Oe or lower, was found not only to have a coercive force Hc as low as 1,000 Oe and be incapable of producing a sufficient effect especially when used with a recent saturation-magnetization metallic head, but also to be apt to suffer demagnetization and an output decrease in a high-intensity magnetic field generated by the head, because the magnetic layer thereof has a multilayer structure with a large thickness and the lower magnetic layer has a low Hc.

Although disk-form magnetic recording media are characterized in having a shorter access time and a smaller size than tape-form magnetic recording media, they have drawbacks that the recording area thereof is limited and the necessity of the random orientation of a magnetic material results in a reduced residual magnetization. Consequently, it has been considerably difficult to obtain a high-performance medium in a disk form.

It should be noted that since JP-A-60-164925 and JP-A-3-49025 disclose mainly tape-form magnetic recording media, the term squareness ratio used therein is limited to either longitudinal-direction squareness ratio or squareness ratio in the head-running direction. There is no description therein concerning squareness ratio for disk-form magnetic recording media.

Although JP-A-5-120675 discloses that the vertical-direction squareness ratio calculated through diamagnetic correction is preferably 0.6 or higher, this regulation concerning squareness ratio is for the intentional impartation of residual magnetization also in the vertical direction. In this case, the desired squareness ratio is thought to have been attained by partly orienting the magnetic material in the vertical direction. However, the orientation of magnetic particles in the vertical direction poses a problem that output waveforms are distorted.

SUMMARY OF THE INVENTION

An object of the present invention is to provide a disk-form magnetic recording medium which eliminates the conventional problems, that is, which is free from the distortion of output waveforms and has been remarkably improved in electromagnetic characteristics, especially in the short-wavelength output necessary to high-density recording which property has long been required of magnetic recording media.

This and other objects of the present invention have been achieved by a disk-form magnetic recording medium comprising a nonmagnetic support having provided thereon at least one magnetic layer comprising a binder and hexagonal ferrite magnetic particles dispersed therein, wherein the magnetic layer has an in-plane coercive force Hc of 1,200 to 3,000 Oe, an Hc/Hk ratio, where Hk is an anisotropy field, of 0.25 or higher, an in-plane orientation ratio of 0.8 or higher, and a vertical-direction squareness ratio calculated through diamagnetic correction of lower than 0.6.

DETAILED DESCRIPTION OF THE INVENTION

The present invention is effective when the Hc/Hk ratio for the medium is 0.25 or higher, preferably 0.35 or higher, and more preferably 0.50 or higher. Although the upper limit of Hc/Hk is uncertain, it is theoretically 1.0. The value of Hc is from 1,200 to 3,000 Oe, preferably from 1,500 to 2,500 Oe, in any position within the medium and in any in-plane direction. Hc and Hk can be easily regulated to desired values, for example, by a method in which a regulated amount of $Fe^{3+}$ ions in regulated positions in barium ferrite are replaced with an element generally selected from Co, Ti, Zn, Nb, Mn, and Sb, or by using a spinel phase as a component of a composite material.

The magnetic recording medium of the present invention has an in-plane orientation ratio of 0.8 or higher, preferably 0.9 or higher. In-plane orientation ratio for a disk-form medium is a value obtained by dividing the minimum in-plane squareness ratio by the maximum in-plane squareness ratio; the higher the value of in-plane orientation ratio, the smaller the in-plane output fluctuations. Namely, magnetic recording disks having higher in-plane orientation ratios are preferred. Orientation ratio can be easily regulated to a desired value by a method of random orientation with a permanent magnet, as disclosed in JP-B-3-41895 (the term "JP-B" as used herein means an "examined Japanese patent publication"), or by a method of applying an alternating-current magnetic field, as disclosed in, e.g., JP-A-63-148417, JP-A-1-300427, and JP-A-1-300428. In this case, the magnetic particles of a hexagonal ferrite have an aspect ratio regarding degree of flatness of 1 to 15, preferably 2 to 7, more preferably 2 to 4. Too high aspect ratios are undesirable in that not only a high orientation ratio is difficult to obtain, but also particle stacking occurs to result in a reduced Hc/Hk ratio.

In the magnetic recording medium of the present invention, the vertical-direction squareness ratio calculated through diamagnetic correction is lower than 0.6, with the lower limit thereof being about 0.2. This vertical-direction squareness ratio is determined by subjecting a measured value of vertical-direction squareness ratio to diamagnetic correction, with the coefficient of diamagnetic field being 1. The vertical-direction squareness ratio may be regulated by a method of random orientation with a permanent magnet, as disclosed in JP-B-3-41895, or by a method of randomly orienting a magnetic material in an in-plane direction by applying an alternating-current magnetic field, as disclosed in JP-A-63-148417 and JP-A-1-300427. A magnetic material having a low aspect ratio regarding degree of flatness is preferred in that such magnetic particles are less apt to orient in the vertical direction. Use of a high-specific-gravity dispersing medium such as, e.g., beads of zirconia, titania, or steel, is preferred in that dispersion of individual magnetic particles proceeds to a high degree and this is effective in achieving random orientation.

Although the reason why the magnetic recording medium of the present invention shows excellent electromagnetic characteristics has not been elucidated, the following explanations are possible. The Hc/Hk ratio, i.e., the ratio of coercive force Hc to anisotropic magnetic field Hk, is a factor which influences the mechanism of the reversal of magnetization; a magnetic layer having a higher Hc/Hk ratio has a greater possibility that the reversal of magnetization occurs as a result of simultaneous rotation. That is, magnetic materials which attain a higher Hc value are more apt to undergo such phenomenon than magnetic materials showing the same Hk value. It is presumed that a magnetic layer in which the reversal of magnetization occurs as a result of simultaneous rotation shows more rapid switching with changing recording magnetic field and, hence, the regions of the reversal of magnetization which are recorded on the magnetic recording medium account for a reduced proportion. Namely, it is thought that a magnetic recording medium having a high Hc/Hk ratio basically has the ability to attain high output. On the other hand, rapid switching tends to disadvantageously cause demagnetization, i.e., the phenomenon in which recorded signals are erased when the recording head separates from the recording medium. Consequently, a high Hc/Hk ratio alone is incapable of enabling the magnetic recording medium to fully exhibit the basic high-output performance. It is thought that the Hc should be increased in order to inhibit demagnetization as much as possible.

The following explanations are also possible. In short-wavelength recording, a high $H_c$ is effective in reducing self-demagnetization and recording demagnetization and in thus attaining stable longitudinal magnetization. On the other hand, a low Hk means that saturation magnetization is apt to occur in the direction of the axis of difficult magnetization. However, in short-wavelength recording in particular, lower Hk values result in stronger tendency for magnetization to remain in the vertical direction, because the vertical magnetization component, i.e., the magnetization component in the direction of the axis of difficult magnetization, contributes more to the formation of a recording magnetization mode. It is therefore presumed that a combination of a high Hc and a low Hk brings about stable magnetization in both the longitudinal and the vertical directions to thereby improve short-wavelength output.

Although higher SQ values are thought to enhance such an effect, isotropic orientation is necessary to a disk-form medium. This is because a magnetic disk which has undergone anisotropic orientation has enhanced modulation and is hence unusable. This problem indicates that a disk-form medium regulated to have a higher coercive force and a reduced magnetic-layer thickness can have a heightened Hc/Hk ratio, like tape-form media.

Next, preferable embodiments according to the present invention are described below.

In the present invention, the magnetic layer supported on the nonmagnetic support which layer contains hexagonal ferrite magnetic particles satisfying the above-described ranges (hereinafter this magnetic layer being referred to as "upper layer" or "upper magnetic layer") may be provided on a nonmagnetic layer comprising inorganic nonmagnetic particles dispersed in a binder, on a lower magnetic layer comprising ferromagnetic particles dispersed in a binder, or on a multilayer structure comprising the nonmagnetic layer and the lower magnetic layer. In the present invention, the term "lower layer" is often used when the nonmagnetic layer and/or the lower magnetic layer provided under the upper layer is referred to without being distinguished from each other, although the term "lower nonmagnetic layer" or "lower magnetic layer" is used when a specific layer is referred to. In providing both lower nonmagnetic layer and lower magnetic layer as the lower layer, either layer may be formed first, and the effect of the invention is basically obtainable regardless of the order of layer formation. If needed, the upper magnetic layer, the lower nonmagnetic layer, and the lower magnetic layer each may have a multilayer structure.

The upper layer may contain another kind of ferromagnetic particles in combination with the ferrite particles, if needed. However, the proportion of the hexagonal ferrite magnetic particles is usually from 50 to 100% by weight, preferably from 80 to 100% by weight, based on all ferromagnetic particles in the upper layer. The ferromagnetic particles for use in the lower layer are not particularly limited, and the same hexagonal ferrite magnetic particles as in the upper layer are usable. The lower layer is free from the above-described requirements which the upper layer is required to satisfy. The term "ferromagnetic particles" used hereinafter means any kind of ferromagnetic particles including hexagonal ferrite magnetic particles, unless otherwise indicated.

In the present invention, the magnetic layer containing hexagonal ferrite particles may be the only layer. However, a lower nonmagnetic layer is preferably provided between the magnetic layer and the support, because the formation of a lower nonmagnetic layer contributes to an improvement in surface properties and facilitates a thickness reduction for the upper layer. A lower magnetic layer containing acicular ferromagnetic particles or other magnetic particles is also preferably provided as another lower layer between the upper magnetic layer and the support, because the lower magnetic layer contributes to an improvement in long-wavelength electromagnetic characteristics.

The residual magnetic flux density (Br) of the magnetic layer containing hexagonal ferrite particles is preferably 700 G or more. If the Br thereof is lower than 700 G, output decreases over the whole wavelength region. There is no particular upper limit to the Br thereof. The SFD of the magnetic layer is 0.7 or less, preferably 0.5 or less.

The thickness of the magnetic layer containing hexagonal ferrite particles is usually from 0.05 to 3.0 µm, preferably from 0.2 to 1.0 µm.

If a nonmagnetic layer is provided, the inorganic nonmagnetic particles contained therein are preferably particles of at least one of titanium dioxide, barium sulfate, zinc oxide, and α-iron oxide.

Preferably, the nonmagnetic layer is coated by a wet-on-wet coating method according to U.S. Pat. No. 4,844,946.

Examples of methods that can be used for practicing the present invention include the following. However, usable methods are, of course, not limited thereto, and methods other than those can be used to attain the object of the invention as long as the requirements specified hereinabove are satisfied.

A magnetic or nonmagnetic coating fluid containing hexagonal ferrite particles dispersed therein or a magnetic or nonmagnetic coating fluid containing magnetic particles dispersed therein is applied to a nonmagnetic support in such amounts that the upper layer thickness containing hexagonal ferrite particles is 3 µm or less after drying. The coating is carried out to make in-plane orientation isotropic without orientation treatment or using a known random orientation device. Furthermore, in calender treatment, the treatment is carried out using a multi-stage roll comprising a metal roll to produce the magnetic recording medium of the present invention.

The hexagonal ferrite magnetic particles for use in the upper layer are explained below.

Examples of the hexagonal ferrite contained in the upper layer in the present invention include substitutional ferrites such as barium ferrite, strontium ferrite, lead ferrite, and calcium ferrite, and Co-substituted ferrites. Specific examples thereof include barium ferrite and strontium ferrite both of the magnetoplumbite type and barium ferrite and strontium ferrite both of the magnetoplumbite type containing a spinel phase as a part thereof. Besides the constituent atoms, these ferrites may contain other atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb. In general, hexagonal ferrites containing elements, such as Co—Ti, Co—Ti—Zr, Co—Ti—Zn, Ni—Ti—Zn, and, Nb—Zn, can be used.

However, it is preferred to reduce the total amount of such additive ingredients to the lowest possible level for the purpose of regulating the Hc/Hk ratio to 0.25 or higher, preferably 0.35 or higher, and more preferably 0.50 or higher, that is, for attaining both a high Hc and a low Hk. This is because such additive ingredients reduce the crystal anisotropy of the hexagonal ferrite and enhance the non-simultaneous magnetization rotation mode, resulting in a reduced Hc/Hk ratio. From the standpoint of heightening Hc/Hk, preferred additive elements are Nb and Zn. Although a spinel phase may be used as a component of a composite material in order to heighten σs, it is preferably used in such an amount that Hc/Hk does not decrease.

The hexagonal ferrite for use in the present invention is usually in the form of hexagonal platy particles, and the diameter of these particles, which means the width of the hexagonal plates, is determined with an electron microscope.

In the present invention, the particle diameter (plate diameter) of the hexagonal ferrite is usually from 0.01 to 0.2 µm, preferably from 0.02 to 0.1 µm. The average thickness (plate thickness) of the particles is usually from 0.001 to 0.2 µm, preferably from 0.003 to 0.05 µm. The aspect ratio is from 1 to 15, preferably from 2 to 7, and more preferably from 2 to 4. If the aspect ratio is higher than 15, it is not preferred because a high orientation ratio cannot be obtained and Hc/Hk is lowered due to generation of particle stacking. The specific surface area of these hexagonal-ferrite particles measured by BET method ($S_{BET}$) is from 25 to 100 m$^2$/g, preferably from 40 to 70 m$^2$/g. Specific surface areas thereof less than. 25 m$^2$/g are undesirable in that an increased noise results, while specific surface areas thereof exceeding 100 m$^2$/g are undesirable in that satisfactory surface properties are difficult to obtain. The us thereof is 50 emu/g or more, preferably 60 emu/g or more. The tap density thereof is preferably 0.5 g/ml or more, more preferably 0.8 g/ml or more. For producing the hexagonal ferrite, any of various methods may be used such as a glass crystallization method, a coprecipitation method, and a hydrothermal reaction method.

The preferred ranges of the hexagonal ferrite of the present invention are as follows. The crystallite size thereof is from 50 to 450 Å, preferably from 100 to 350 Å. The water content thereof is from 0.01 to 2%, and is preferably optimized according to the kind of the binder used. The pH is from 4 to 12, preferably from 6 to 10, with the optimum pH varying depending on the kind of the binder used. If needed, the surface of the magnetic particles may be treated, for example, with Al, Si, P, or oxides thereof. Preferred is a surface treatment with $Al_2O_3$ or $SiO_2$. The amount or proportion of the surface-treating agent, which is desirably varied according to the kind of the binder used, is from 0.1 to 10% based on the amount of the magnetic particles. This surface treatment is preferred in that it reduces the adsorption of a lubricant, e.g., a fatty acid, to 100 mg/m$^2$ or less. Although there are cases where the magnetic particles contain soluble inorganic ions of, e.g., Na, Ca, Fe, Ni, and Sr, these ions do not particularly influence the properties as long as the concentration thereof is 500 ppm or less.

Next, the ferromagnetic particles for use in the lower magnetic layer of the present invention are described below. Known ferromagnetic particles may be employed as the ferromagnetic particles for use in the lower magnetic layer of the present invention. Examples thereof include γ-FeOx (x=1.33–1.5), Co-modified γ-FeOx (x=1.33–1.5), ferromagnetic alloy fine particles containing Fe, Ni, or Co as the main component (75% or more), and acicular barium ferrite. Preferred are ferromagnetic alloy particles containing α-Fe as the main component and the Co-modified γ-FeOx.

Besides the atoms specified above, the ferromagnetic particles may contain other atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb.

Before being dispersed, the fine ferromagnetic particles may be treated with, for example, a dispersant, a lubricant, a surfactant, or an antistatic agent. These treatments are described in, for example, JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005, and 3,389,014.

The fine ferromagnetic alloy particles among the ferromagnetic particles of the above-enumerated kinds may contain a small amount of hydroxide or oxide. For obtaining the fine ferromagnetic alloy particles for use in the present invention, a known method may be used. Examples thereof include: a method in which reduction is conducted with an organic acid double salt (mainly comprising oxalate) and a reducing gas such as hydrogen; a method comprising reducing iron oxide with a reducing gas such as hydrogen to obtain Fe or Fe—Co particles; a method comprising pyrolyzing a metal carbonyl compound; a method in which reduction is conducted by adding a reducing agent such as sodium boron hydride, hypophosphite, or hydrazine to an aqueous solution of ferromagnetic metal; and a method comprising vaporizing metal in a low-pressure inert gas to obtain fine particles. The thus-obtained ferromagnetic alloy particles may be used after undergoing a known gradual oxidation treatment. This treatment can be conducted by any of the following: a method comprising immersing the particles in an organic solvent, followed by drying; a method comprising immersing the particles in an organic solvent and feeding an oxygen-containing gas to form an oxide film on the surfaces, followed by drying; and a method in which an oxide film is formed on the surfaces by controlling the partial pressures of oxygen gas and an inert gas, without using an organic solvent. The ferromagnetic particles have a specific surface area as determined by BET method of 25 to 80 m$^2$/g, preferably 40 to 70 m$^2$/g. Specific surface areas thereof less than 25 m$^2$/g are undesirable in that an increased noise results; while specific surface areas thereof more than 80 m$^2$/g are undesirable in that satisfactory surface properties are difficult to obtain. The us of the magnetic iron oxide particles is 50 emu/g or more, preferably 70 emu/g or more; while the as of the fine ferromagnetic metal particles is preferably 100 emu/g or more, more preferably from 110 to 170 emu/g. The coercive force thereof is preferably from 500 to 2,500 Oe, more preferably from 800 to 2,000 Oe.

The tap density of γ-iron oxide is preferably 0.5 g/ml or more, more preferably 0.8 g/ml or more. In alloy particles, the tap density thereof is preferably from 0.2 to 0.8 g/ml. Tap densities of alloy particles more than 0.8 g/ml tend to result in acceleration of the oxidation of the ferromagnetic particles during compaction, so that a sufficient σs is difficult to obtain. If the tap density of alloy particles is less than 0.2 g/ml, insufficient dispersion tends to result. In using γ-iron oxide, the proportion of divalent iron to trivalent iron is preferably from 0 to 20%, more preferably from 5 to 10%. Further, the amount of cobalt atoms is from 0 to 15%, preferably from 2 to 8%, based on the amount of iron atoms.

The lower magnetic layer formed under the upper magnetic layer containing a hexagonal ferrite in the magnetic recording medium of the present invention preferably has a coercive force of 500 to 2,500 Oe, a squareness ratio of 0.6 to 0.95, Br of 1,000 to 4,000 G, and SFD of 0.6 or lower.

The center-line average surface roughness of each of the lower layer and the upper layer in the present invention is preferably 0.006 µm or less, if the individual layers (which each may have a multilayer structure) are separately coated.

The nonmagnetic particles for use in the lower nonmagnetic layer of the present invention are described below. The inorganic nonmagnetic particles can be selected from inorganic compounds such as metal oxides, metal carbonates, metal sulfates, metal nitrides, metal carbides, and metal sulfides. Specific examples of the inorganic compounds include α-alumina having an α-alumina structure content of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. They may be used alone or in combination. Particularly preferred of these are titanium dioxide, zinc oxide, iron oxide, and barium sulfate. The particle sizes of the nonmagnetic particles are preferably from 0.005 to 2 µm, more preferably from 0.01 to 1 µm. It is, however, possible to use a combination of two or more kinds of nonmagnetic particles having different particle sizes, if needed. Alternatively, the same effect can be produced by using one kind of nonmagnetic particles having a wide particle diameter distribution. The tap density thereof is from 0.05 to 2 g/ml, preferably from 0.2 to 1.5 g/ml. The water content thereof is from 0.1 to 5%, preferably from 0.2 to 3%. The pH thereof is from 2 to 11, preferably from 6 to 9. The specific surface area thereof is from 1 to 100 m$^2$/g, preferably from 5 to 50 m$^2$/g, and more preferably from 7 to 40 m$^2$/g. The crystallite size thereof is preferably from 0.01 to 2 µm. The oil absorption thereof as measured with DBP is from 5 to 100 ml/100 g, preferably from 10 to 80 ml/100 g, and more preferably from 20 to 60 ml/100 g. The specific gravity thereof is from 1 to 12, preferably from 3 to 6.

The particle shape thereof may be any of the acicular, spherical, polyhedral, platy, or hexagonal platy shapes. In acicular particles, the aspect ratio thereof is preferably from 2 to 15. The ignition loss thereof is preferably 20% or less. The inorganic particles for use in the present invention preferably have a Mohs' hardness of 4 or more. The roughness factors of the surfaces of these kinds of particles are preferably from 0.8 to 1.5, more preferably from 0.9 to 1.2. The stearic acid (SA) adsorption thereof is from 1 to 20 µmol/m$^2$, preferably from 2 to 15 µmol/m$^2$. The nonmagnetic particles for use in the lower layer preferably have a heat of wetting by water in the range of 200 to 600 erg/cm$^2$ at 25° C. A solvent which gives a heat of wetting in the above range can be used. The appropriate number of water molecules present on the surfaces thereof at 100° to 400° C. is from 1 to 10 per 100 Å$^2$. The isoelectric-point pH thereof in water is preferably from 3 to 6. The surfaces of these particles are preferably treated with $Al_2O_3$, $SiO_2$, $TiO_2$, $ZrO_2$, $SnO_2$, $Sb_2O_3$, or ZnO. Of these, $Al_2O_3$, $SiO_2$, $TiO_2$, and $ZrO_2$ are preferred from the standpoint of dispersibility, with $Al_2O_3$, $SiO_2$, and $ZrO_2$ being particularly preferred. These may be used in combination or alone. A treated surface layer formed by coprecipitation may be used according to purpose. It is also possible to use a treated surface layer having a structure formed by first treating with alumina and then treating the resulting surface layer with silica, or to use a treated surface layer having a structure which is the reverse of the above structure. Although the treated surface layer may be made porous if desired and needed, a homogeneous and dense surface layer is generally preferred.

Specific examples of inorganic nonmagnetic particles for use in the present invention include UA5600, UA5605, and Nanotite manufactured by Showa Denko K.K.; AKP-20, AKP-30, AKP-50, HIT-55, HIT-100, and ZA-G1 manufactured by Sumitomo Chemical Co., Ltd.; G5, G7, and S-1 manufactured by Nippon Chemical Industrial Co., Ltd.; TF-100, TF-120, TF-140, R516, DPN250, and DPN250BX manufactured by Toda Kogyo Co., Ltd.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680, and TY-50 manufactured by Ishihara Sangyo Kaisha, Ltd.; ECT-52, STT-4D, STT-30D, STT-30, and STT-65C manufactured by Titan Kogyo K.K.; T-1 manufactured by Mitsubishi Material Co., Ltd.; NS-O, NS-3Y, and NS-8Y manufactured by Nippon Shokubai Kagaku Kogyo Co., Ltd.; MT-100S, MT-100T, MT-150W, MT-500B, MT-600B, and MT-100F manufactured by Teika Co., Ltd.; FINEX-25, BF-1, BF-10, BF-20, BF-1L, and BF-10P manufactured by Sakai Chemical Industry Co., Ltd.; DEFIC-Y and DEFIC-R manufactured by Dowa Mining Co., Ltd.; and Y-LOP manufactured by Titan Kogyo CO., Ltd. and nonmagnetic particles obtained by calcining them.

Especially preferred inorganic nonmagnetic particles are titanium dioxide particles. Consequently, titanium dioxide is described in detail with respect to production processes thereof. For producing titanium dioxide products, the sulfuric acid process and the chlorine process are mainly used. In the sulfuric acid process, a raw ore of ilmenite is leached with sulfuric acid to extract, e.g., Ti, Fe as sulfates. The iron sulfate is removed by crystallization, and the remaining titanyl sulfate solution is purified by filtration and then subjected to hydrolysis with heating to thereby precipitate hydrous titanium oxide. This precipitate is separated by filtration and then washed to remove impurities. Calcination of the resulting precipitate at 80° to 1,000° C. after addition of a particle size regulator or the like gives crude titanium oxide. The titanium oxide is of rutile form or anatase form according to the nucleating agent added in hydrolysis. This, crude titanium oxide is ground, sieved, and subjected to, e.g., surface treatment, thereby to produce a titanium dioxide product. In the chlorine process, natural or synthetic rutile is used as the raw ore. The ore is chlorinated under high-temperature reducing conditions to convert the Ti to $TiCl_4$ and the Fe to $FeCl_2$, and the iron chloride is solidified by cooling and separated from the liquid $TiCl_4$. The crude $TiCl_4$ obtained is purified by rectification and a nucleating agent is added thereto. This crude $TiCl_4$ is instantaneously reacted with oxygen at a temperature of 1,000° C. or more to obtain crude titanium oxide. For imparting pigmenting properties to the crude titanium oxide yielded in the above oxidative decomposition step, the same finishing technique as in the sulfuric acid process is employed.

The surface treatment of the titanium oxide material may be conducted as follows. The material is dry-ground, and water and a dispersant are then added thereto. The resulting slurry is subjected to wet grinding, followed by centrifugal separation to separate coarse particles. The resulting slurry of fine particles is then transferred to a surface treatment tank, where surface covering with a metal hydroxide is performed. First, an aqueous solution of a predetermined amount of a salt of, e.g., Al, Si, Ti, Zr, Sb, Sn, or Zn, is added to the slurry and an acid or alkali is added to neutralize the resulting slurry to thereby form a hydrous oxide and cover the surfaces of the titanium oxide particles with the oxide. The water-soluble salts formed as by-products are removed by decantation, filtration, and washing. The slurry is subjected to final pH adjustment, filtration, and washing with pure water. The resulting cake is dried with a spray dryer or band dryer. Finally, the dry particles are ground with a jet mill to give a product. In place of such a wet process, the surface treatment can be conducted by passing vapors of $AlCl_3$ and $SiCl_4$ through titanium oxide particles and then passing water vapor to treat the particle surfaces with Al and Si. With respect to processes for the production of other pigments, reference may be made to *Characterization of Powder Surfaces*, published by Academic Press.

Carbon black may be incorporated into the lower nonmagnetic layer, whereby the known effect of reducing Rs can be produced. For this purpose, carbon black, such as furnace black for rubbers, thermal black for rubbers, coloring black, and acetylene black, can be used. The specific surface area of the carbon black is from 100 to 500 $m^2/g$, preferably from 150 to 400 $m^2/g$, and the DBP absorption thereof is from 20 to 400 ml/100 g, preferably from 30 to 200 ml/100 g. The particle diameter thereof is from 5 to 80 nm, preferably from 10 to 50 nm, and more preferably from 10 to 40 nm. The carbon black preferably has a pH of 2 to 10, a water content of 0.1 to 10%, and a tap density of 0.1 to 1 g/ml. Specific examples of carbon black for use in the present invention include BLACKPEARLS 2000, 1300, 1000, 900, 800, 880, 700, and VULCAN XC-72 manufactured by Cabot Corporation; #3050B, #3150B, #3250B, #3750B, #3950B, #950, #650B, #970B, #850B, and MA-600 manufactured by Mitsubishi Chemical Corporation; CONDUCTEX SC manufactured by Columbia Carbon Co.; RAVEN 8800, 8000, 7000, 5750, 5250, 3500, 2100, 2000, 1800, 1500, 1255, and 1250 manufactured by RAVEN; and Ketjen Black EC manufactured by Lion Akzo Co., Ltd. These carbon blacks may be surface-treated with a dispersant or another agent or grafted with a resin before use. Carbon black whose surfaces have been partly graphitized may also be used. Further, before being added to a coating fluid, the carbon black may be dispersed into a binder. These carbon blacks can be used in an amount of 50% or less by weight based on the inorganic particles and 40% or less based on the total weight of the nonmagnetic layer. These carbon blacks can be used alone or in combination. With respect to carbon blacks usable in the present invention, reference may be made to, for example, *Carbon Black Binran* (Carbon Black Handbook), edited by Carbon Black Association.

Organic particles for use in the present invention include acrylic-styrene resin particles, benzoguanamine resin particles, melamine resin particles, and phthalocyanine pigments. Other usable examples thereof include polyolefin resin particles, polyester resin particles, polyamide resin particles, polyimide resin particles, and poly(fluoride ethylene) resins. For producing these organic particles, techniques such as those described in JP-A-62-18564 and JP-A-60-255827 can be used. It should be noted that although an undercoat layer is provided in ordinary magnetic recording media, this undercoat layer, which has a thickness of 0.5 μm or less, is intended to improve adhesion between the support and the magnetic or another layer and is different from the lower layer in the present invention. In the present invention, an undercoat layer is preferably provided to improve adhesion between the lower layer and the support.

The same binders, lubricants, dispersants, additives, solvents, and dispersing techniques as those for the magnetic layer can be used for the nonmagnetic layer. In particular, known techniques usable for magnetic layers can be applied with respect to the amounts and kinds of binders and the amounts and kinds of additives and dispersants. The thickness of the lower nonmagnetic layer is from 0.2 to 5 μm, preferably from 1 to 3 μm.

The binder for use in the upper layer and the lower layer in the present invention may be a conventionally known thermoplastic resin, thermosetting resin, or reactive resin, or a mixture thereof.

The thermoplastic resin may be one having a glass transition temperature of −100° to 150° C., a number-average molecular weight of 1,000 to 200,000, preferably from 10,000 to 100,000, and a degree of polymerization of about from 50 to 1,000.

Examples of the thermoplastic resins include polymers or copolymers containing a structural unit derived from vinyl chloride, vinyl acetate, vinyl alcohol, maleic acid, acrylic acid, acrylic ester, vinylidene chloride, acrylonitrile, methacrylic acid, methacrylate, styrene, butadiene, ethylene, vinyl butyral, vinyl acetal, or vinyl ether, polyurethane resins, and various rubber-type resins.

Examples of the thermosetting or reactive resin include phenolic resins, epoxy resins, thermosetting polyurethane resins, urea resins, melamine resins, alkyd resins, reactive acrylic resins, formaldehyde resins, silicone resins, epoxy-polyamide resins, mixtures of polyester resin and isocyanate prepolymer, mixtures of polyester polyol and polyisocyanate, and mixtures of polyurethane and polyisocyanate. These resins are described in detail in *Plastic Handbook* published by Asakura Shoten. It is also possible to use a known resin of the electron beam-curing type for each of the layers. Examples of the resins and production processes therefor are described in detail in JP-A-62-256219.

The resins enumerated above can be used alone or in combination. Preferred examples of those include combinations of a polyurethane resin with at least one member selected from vinyl chloride resins, vinyl chloride-vinyl acetate resins, vinyl chloride-vinyl acetate-vinyl alcohol resins, and vinyl chloride-vinyl acetate-maleic anhydride copolymers, and further include combinations of these with polyisocyanate.

The polyurethane resins may have a known structure such as polyester polyurethane, polyether polyurethane, polyether polyester polyurethane, polycarbonate polyurethane, polyester polycarbonate polyurethane, or polycaprolactone polyurethane. For obtaining further improved dispersibility and durability, it is preferred to use, according to need, one or more of the above-enumerated binders which have, incorporated therein through copolymerization or addition reaction, at least one polar group selected from —COOM, —$SO_3M$, —$OSO_3M$, —P=O(OM)$_2$, —O—P=O(OM)$_2$ (wherein M represents a hydrogen atom or an alkali metal salt group), —OH, —$NR_2$, —$N^+R_3$ (R represents a hydrocarbon group), an epoxy group, —SH, and —CN. The amount of the polar group(s) is from $10^{-1}$ to $10^{-8}$ mol/g, preferably from $10^{-2}$ to $10^{-6}$ mol/g.

Specific examples of those binders for use in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Corp.; MPR-TA, MPR-TA5, MPR-TAL, MPR-TSN, MPR-TMF, MPR-TS, MPR-TM, and MPR-TAO manufactured by Nisshin Chemical Industry Co., Ltd.; 1000W, DX80, DX81, DX82, DX83, and 100FD manufactured by Denki Kagaku Kogyo K.K.; MR-105, MR110, MR100, and 400X-110A manufactured by Nippon Zeon Co., Ltd.; Nippolan N2301, N2302, and N2304 manufactured by Nippon Polyurethane Industry Co. Ltd.; Pandex T-5105, T-R3080, T-5201, Burnock D-400, D-210-80, Crisvon 6109, and 7209 manufactured by Dainippon Ink & Chemicals, Inc.; Vylon UR8200, UR8300, UR8600, UR5500, UR4300, RV530, and RV280 manufactured by Toyobo Co., Ltd.; Daipheramin 4020, 5020, 5100, 5300, 9020, 9022, and 7020 manufactured by Dainichiseika Color & Chemicals Mfg., Co., Ltd.; MX5004 manufactured by Mitsubishi Chemical Corporation; Sunprene SP-150, TIM-3003, and TIM-3005 manufactured by Sanyo Chemical Industries, Co., Ltd.; and Saran F310 and F210 manufactured by Asahi Chemical Industry Co., Ltd.

The amount of the binder used in the nonmagnetic layer or in the magnetic layer in the present invention is from 5 to 50% by weight, preferably from 10 to 30% by weight, based on the amount of the nonmagnetic particles or the ferromagnetic particles, respectively. In employing a vinyl chloride resin, it is preferred to use the same in an amount of 5 to 30% by weight in combination with from 2 to 20% by weight polyurethane resin and from 2 to 20% by weight polyisocyanate. In using polyurethane in the present invention, this resin preferably has a glass transition temperature of $-50°$ to $100°$ C., an elongation at break of 100 to 2,000%, a stress at break of 0.05 to 10 $kg/cm^2$, and a yield point of 0.05 to 10 $kg/cm^2$.

The magnetic recording medium of the present invention has at least one magnetic layer containing hexagonal ferrite magnetic particles. Consequently, it is, of course, possible to form the nonmagnetic layer and the magnetic layers so that these layers differ from each other in binder amount, the proportion of a vinyl chloride resin, polyurethane resin, polyisocyanate, or another resin in the binder, the molecular weight of each resin contained in each magnetic layer, polar group amount, the aforementioned physical properties of resin according to need. For attaining this, known techniques concerning multilayered magnetic layers are applicable. For example, in the case of forming layers having different binder amounts, an increase in binder amount in the upper magnetic layer is effective in diminishing the marring of the upper magnetic layer surface, while an increase in binder amount in either the upper magnetic layer or the lower nonmagnetic layer to impart flexibility is effective in improving head touching.

Examples of the polyisocyanate for use in the constituent layers of the magnetic recording medium of the present invention include isocyanates such as tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, and triphenylmethane triisocyanate, products of the reactions of these isocyanates with polyalcohols, and polyisocyanates formed through condensation of isocyanates. These isocyanates are commercially available under the trade names of: Coronate L, Coronate HL, Coronate 2030, Coronate 2031, Millionate MR, and Millionate MTL manufactured by Nippon Polyurethane Co., Ltd.; Takenate D-102, Takenate D-110N, Takenate D-200, and Takenate D-202 manufactured by Takeda Chemical Industries, Ltd.; and Desmodule L, Desmodule IL, Desmodule N, and Desmodule HL manufactured by Sumitomo Bayer Co., Ltd. For each of the layers, these polyisocyanates may be used alone, or used in combination of two or more thereof, taking advantage of a difference in curing reactivity.

The carbon black for use in the magnetic layer in the present invention includes furnace black for rubbers, thermal black for rubbers, coloring black, and acetylene black. The carbon black preferably has a specific surface area of 5 to 500 $m^2/g$, a DBP absorption of 10 to 400 ml/100 g, a particle diameter of 5 to 300 nm, a pH of 2 to 10, a water content of 0.1 to 10%, and a tap density of 0.1 to 1 g/ml. Specific examples of carbon blacks usable in the present invention include BLACKPEARLS 2000, 1300, 1000, 900, 800, 700, and VULCAN XC-72 manufactured by Cabot Corporation; #80, #60, #55, #50, and #35 manufactured by Asahi Carbon Co., Ltd.; #2400B, #2300, #900, #1000, #30, #40, and #10B manufactured by Mitsubishi Chemical Corporation; and CONDUCTEX SC manufactured by Columbia Carbon Co.; and RAVEN 150, 50, 40, and 15 manufactured by Raven Co., Ltd. These carbon blacks may be surface-treated with a dispersant or another agent or grafted with a resin before use. Carbon black whose surfaces have been partly graphitized may also be used. Further, before being added to a magnetic coating fluid, the carbon black may be dispersed into a binder. These carbon blacks can be used alone or in combination. The carbon black is preferably used in an amount of 0.1 to 30% by weight based on the amount of the ferromagnetic particles. The carbon black incorporated in the magnetic layer functions to prevent static buildup in the layer, to reduce the coefficient of friction of the layer, as a light screen for the layer, and to improve the strength of the layer. Such effects are produced to different degrees depending on the kind of carbon black used. Therefore it is, of course, possible in the present invention to properly use carbon blacks according to the purpose so as to give an upper magnetic layer, a lower nonmagnetic layer, and a lower magnetic layer which differ in the kind, amount, and combination of carbon blacks, on the basis of the above-described properties including particle size, oil absorption, electrical conductivity, and pH. With respect to carbon blacks usable in the magnetic layer in the present invention, reference may be made to, for example, *Carbon Black Binran* (Carbon Black Handbook) edited by Carbon Black Association.

In the present invention, an abrasive material is used in the upper magnetic layer and may also be used in the lower magnetic layer. Known abrasive materials mostly having a Mohs' hardness of 6 or more can be used alone or in combination. Examples thereof include α-alumina having an α-alumina structure content of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. A composite made up of two or more of these abrasive materials (e.g., one obtained by surface-treating one abrasive material with another) may also be used. Although in some cases these abrasive materials contain compounds or elements other than the main component, the same effect is obtained with such abrasive materials as long as the content of the main component is 90% or more. These abrasive materials preferably have a particle size of 0.01 to 2 μm. If desired and needed, abrasive materials having different particle sizes may be used in combination, or a single abrasive material having a widened particle diameter distribution may be used so as to produce the same effect. The abrasive material preferably has a tap density of 0.3 to 2 g/ml, a water content of 0.1 to 5%, a pH of 2 to 11, and a specific surface area of 1 to 30 $m^2/g$. Although abrasive materials that can be used in the present invention may have any particle shape selected from the acicular, particulate, spherical, and cubical forms, a particle shape having a sharp corner as part of the contour is preferred because abrasive materials of this shape have high abrasive properties.

Part or all of the additives to be used in the present invention may be added at any step in a process for producing a magnetic or nonmagnetic coating fluid. For example, it is possible: to mix the additives with ferromagnetic particles prior to a kneading step; to add the additives during the kneading of ferromagnetic particles, a binder, and a solvent; to add the additives at a dispersing step; to add the additives after dispersion; or to add the additives immediately before coating. There are cases where the purpose is achieved by applying part or all of the additives, according to the purpose, by simultaneous or successive coating after magnetic layer application. Further, it is possible, according to purpose, to apply a lubricant on the magnetic layer surface after calendering or slitting.

Examples of available lubricant products for use in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hardened castor oil fatty acid, NAA-42, NAA-44, Cation SA, Cation MA, Cation AB, Cation BB, Naymeen L-201, Naymeen L-202, Naymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid manufactured by NOF Corporation; oleic acid manufactured by Kanto Chemical Co., Ltd.; FAL-205 and FAL-123 manufactured by Takemoto Yushi Co., Ltd.; Enujerub LO, Enujerub IPM, and Sansosyzer E4043 manufactured by Shin Nihon Rika Co., Ltd.; TA-3, KF-96, KF-96L, KF-96H, KF410, KF420, KF965, KF54, KF50, KF56, KF-907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935 manufactured by Shin-Etsu Chemical Co., Ltd.; Armide P, Armide C, and Armoslip CP manufactured by Lion Ahmer Co., Ltd.; Duomin TDO manufactured by Lion Fat and Oil Co., Ltd.; BA-41G manufactured by Nisshin Oil Mills Co., Ltd.; and Profan 2021E, Newpole PE61, Ionet MS-400, Ionet MO-200, Ionet DL-200, Ionet DS-300, Ionet DS-1000, and Ionet DO-200 manufactured by Sanyo Chemical Co., Ltd.

Examples of organic solvents for use in the present invention include ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ethers, glycol monoethyl ethers, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; and other compounds such as N,N-dimethylformamide and hexane. These solvents may be used in arbitrary proportions. These organic solvents need not be 100% pure, and may contain impurities, such as isomers, unreacted raw materials, by-products, decomposition products, oxidation products, and water, besides the main components. The content of these impurities is preferably 30% or less, more preferably 10% or less. It is preferred in the present. invention that the organic solvent used for the upper layer be of the same kind as that used for the lower layer. Different solvent amounts may be used for the two layers. It is important that solvents having higher surface tensions (e.g., cyclohexanone, dioxane) should be used for the lower layer to enhance the stability of coating. Specifically, the arithmetic mean thereof for the upper layer solvents should be not lower than that for the lower layer solvents. From the standpoint of improving dispersibility, solvents which are polar to some degree are preferred, and a preferred solvent composition is one at least 50% of which is accounted for by one or more solvents having a dielectric constant of 15 or more. The preferred range of solubility parameter is from 8 to 11.

The thickness of the nonmagnetic support is from 2 to 100 µm, preferably from 10 to 80 µm. The total thickness of the upper layer and the lower layer is from 1/100 to 2 times the thickness of the nonmagnetic support. An undercoat layer may be provided between the nonmagnetic support and the lower layer in order to improve adhesion. The thickness of the undercoat layer may be from 0.01 to 2 µm, preferably from 0.02 to 0.5 µm. Furthermore, a back coat layer may be provided on the nonmagnetic support on the side opposite to the magnetic layer. The thickness of the back coat layer may be from 0.1 to 2 µm, preferably from 0.3 to 1.0 µm. The undercoat layer and back coat layer may be known ones. The magnetic recording medium of the present invention may be a disk-like medium having magnetic layers on both sides thereof, wherein the magnetic layers or the nonmagnetic and magnetic layers are provided on the both sides of the nonmagnetic support.

The nonmagnetic support for use in the present invention may be a known film. Examples thereof include films of polyesters such as poly(ethylene terephthalate) and poly (ethylene naphthalate), polyolefins, cellulose triacetate, polycarbonates, polyamides, polyimides, poly(amideimide) s, polysulfone, aramids, aromatic polyamides, and polybenzoxazole. The support is preferably made of a high-strength material such as poly(ethylene naphthalate) or polyamide. If desired and needed, a laminate support such as that described in JP-A-3-224127 may be used in order that the magnetic layer surface and the base surface have different surface roughnesses. These supports may be subjected beforehand to, e.g., corona discharge treatment, plasma treatment, adhesion-promoting treatment, heat treatment, dust-removing treatment. The support of the present invention may be an aluminum or glass substrate.

In order to attain the objects of the present invention, it is preferred to use a nonmagnetic support having a center plane average surface roughness SRa of 20 nm or less, preferably 10 nm or less, and more preferably 5 nm or less, measured by a mirau method of TOPO-3D produced by Wyko Co., Ltd. In addition to the requirement of low center plane average surface roughness, the nonmagnetic support is preferably free from projections as large as 1 µm or more. The state of the surface roughness of the support can be freely controlled by changing the size and amount of a filler which is incorporated into the support if desired and needed. Examples of the filler include oxides or carbonates of Ca, Si, and Ti and fine organic powders such as acrylic powder. The support preferably has a maximum height SRmax of 1 µm or less, a ten-point average roughness SRz of 0.5 µm or less, a center-plane peak height SRp of 0.5 µm or less, a center-plane valley depth SRv of 0.5 µm or less, a center-plane areal ratio SSr of 10% to 90%, and an average wavelength S$\lambda$a of 5 µm to 300 µm. The number of surface projections having a size of 0.01 to 1 µm present on these supports can be controlled with a filler of 0 to 2,000 per 0.1 mm$^2$.

The nonmagnetic support for use in the present invention preferably has an F-5 value in the tape running direction of 5 to 50 kg/mm$^2$ and an F-5 value in the tape width direction of 3 to 30 kg/mm². Although the F-5 value in the tape length direction is generally higher than that in the tape width direction, this does not apply in the case where the width-direction strength, in particular, should be enhanced. The degrees of thermal shrinkage of the support in the tape running direction and in the tape width direction are preferably 3% or less, more preferably 1.5% or less, under conditions at 100° C. for 30 minutes, and are preferably 1% or less, more preferably 0.5% or less, under conditions at 80° C. for 30 minutes. The strength at-break thereof is preferably from 5 to 100 kg/mm², and the modulus thereof is preferably from 100 to 2,000 kg/mm². Preferably, the hating properties and the mechanical properties in each direction in the plane of the support are almost the same within the range of 10%.

A process for preparing a magnetic coating fluid to be used for producing the magnetic recording medium of the present invention comprises at least a kneading step and a dispersing step, and may further comprise a mixing step that may be conducted, if needed, before and after the two steps. Each step may include two or more stages. Each of the materials for use in the present invention, including ferromagnetic particles, inorganic nonmagnetic particles, binder, carbon black, abrasive material, antistatic agent, lubricant, and solvent, may be added in any step either at the beginning of or during the step. Further, the individual raw materials may be added portion-wise in two or more steps. For example, a polyurethane may be added portion-wise in each of the kneading step, the dispersing step, and the mixing step for viscosity adjustment after the dispersion. Conventionally known manufacturing techniques can, of course, be used as part of the process to attain the object of the present invention. Use of a kneading machine having high kneading power, such as a continuous kneader or pressure kneader, in the kneading step is advantageous in that improved gloss is obtained. In using a continuous kneader or pressure kneader, the ferromagnetic or nonmagnetic particles are kneaded together with all or part. (preferably at least 30% of all binder) of the binder, the binder amount being in the range of 15 to 500 parts by weight per 100 parts by weight of the ferromagnetic particles. Details of this kneading treatment are given in JP-A-1-166338 and JP-A-64-79274. For preparing a coating fluid for the nonmagnetic layer, use of a dispersing medium having a high specific gravity, such as zirconia, steel, and titania, is preferred. However, the optimized conditions must be selected so as not to break down the hexagonal ferrite magnetic particles.

The following constitutions can be proposed as exemplary coating apparatuses and methods for producing multilayered magnetic recording media such as that of the present invention. 1. A lower layer is first applied with a coating apparatus commonly used for magnetic coating fluid application, e.g., a gravure coating, roll coating, blade coating, or extrusion coating apparatus, and an upper layer is then applied, while the lower layer is in a wet state, by means of a support-pressing extrusion coater such as those disclosed in JP-B-1-46186, JP-A-60-238179, and JP-A-2-265672.

2. An upper layer and a lower layer are applied almost simultaneously using a single coating head having therein two slits for passing coating fluids, such as those disclosed in JP-A-63-88080, JP-A-2-17971, and JP-A-2-265672.

3. An upper layer and a lower layer are applied almost simultaneously with an extrusion coater equipped with a back-up roll, such as that disclosed in JP-A-2-174965.

In order to prevent the electromagnetic characteristics and other properties of the magnetic recording medium from being impaired by aggregation of ferromagnetic particles, shearing is preferably applied to the coating fluid present in the coating head by a method such as those disclosed in JP-A-62-95174 and JP-A-1-236968. The viscosity of each coating fluid should be in the range as specified in JP-A-3-8471.

The magnetic layer and nonmagnetic layers of the present invention are preferably provided according to the above method.

Sufficient isotropic orientation may be provided by non-orientation without using an orientation apparatus. However, known random orientation apparatus is preferably by diagonally locating cobalt magnets alternately.

During the application of a magnetic field, the amount of the organic solvent contained in the coating is preferably regulated to a value within the range specified hereinabove by controlling the temperature and amount of the air fed for drying or by controlling the rate of coating. In other words, it is preferred that the place in which the coating is dried be made controllable. The rate of coating is from 20 to 1,000 m/min, and the temperature of the drying air is preferably 60 or higher. Predrying may be performed to an appropriate degree before the coated support enters the magnet zone.

Examples of calendering rolls that can be used for producing the magnetic recording medium of the present invention include rolls of a heat-resistant plastic, e.g., epoxy, polyimide, polyamide, or poly(imideamide), and metal rolls. Preferred is calendering with metal rolls. The calendering temperature is preferably from 70° C. or higher, and more preferably 100° C. or higher. The linear pressure is preferably 200 kg/cm or more, and more preferably from 300 kg/cm or more.

The coefficients of friction of the magnetic recording medium of the present invention are 0.5 or less, preferably 0.3 or less, throughout the temperature range of −10° to 40° C. and the humidity range of 0 to 95%. The surface resistivity on both sides is preferably from $10^4$ to $10^{12}$ Ω/sq, and the electrification potential thereof is preferably from −500 V to +500 V. The modulus at 0.5% elongation of the upper magnetic layer is preferably from 100 to 2,000 kg/mm² in both the running and width directions, and the strength at break thereof is preferably from 1 to 30 kg/cm². The modulus of the magnetic recording medium is preferably from 100 to 1,500 kg/mm² in both running and width directions, the residual elongation thereof is preferably 0.5% or less, and the thermal shrinkage thereof at temperature of 100° C. or less is preferably 1% or less, more preferably 0.5% or less, and most preferably 0.1% or less. The glass transition temperature (the temperature at which the loss modulus in a dynamic viscoelasticity measurement at 110 Hz becomes maximum) of the magnetic layer is preferably from 50° to 120° C.; while that of the lower nonmagnetic is preferably from 0° to 100° C. The loss modulus is preferably from $1 \times 10^8$ to $8 \times 10^9$ dyne/cm², and the loss tangent is preferably 0.2 or less. Too large loss tangents tend to result in troubles due to sticking. Preferably, the hating properties and the mechanical properties in each direction in the plane are almost the same within the range of 10%. The residual solvent content in the upper layer is preferably 100 mg/m² or less, more preferably 10 mg/m² or less. It is preferred that the residual solvent content in the upper layer be lower than that in the lower layer.

The void content in each of the upper layer and the lower layer is preferably 30% by volume or less, more preferably 20% by volume or less. Although a lower void content is desirable for attaining higher output, there are cases where a certain degree of void content is preferred according to purpose. For example, in the case of a magnetic recording medium for data recording use where suitability for repeated running operations is important, higher void contents in most cases bring about better running durability.

The center plane surface roughness Ra according to a mirau method of TOPO-3D in the upper layer is 10 nm or less, preferably 5 nm or less, and the RMS surface roughness $R_{RMS}$ according to AFM is preferably from 2 to 15 nm. The upper layer has preferably a maximum height SRmax of 0.5 µm or less, a ten-point average roughness SRz of 0.3 µm or less, a center plane peak height SRp of 0.3 µm or less, a center-plane valley depth SRv of 0.3 µm or less, a center-plane areal ratio SSr of from 20 to 80%, and an average wavelength SλA of 5 to 300 µm. The upper layer surface may have from 0 to 2,000 projections having a size of 0.01 to 1 µm. The number of these projections can be easily controlled, for example, by regulating the surface irregularities of the support with a filler or by the surface irregularities of calendering rolls.

The magnetic recording medium of the present invention, which preferably has a lower layer and an upper layer, can be made to have a difference in physical property between the lower layer and the upper layer according to purpose, as can be easily presumed. For example, the upper layer is made to have a heightened modulus to improve running durability and, at the same time, the lower layer is made to have a lower modulus than the upper layer to improve the head touching of the magnetic recording medium.

Since the magnetic layer in the magnetic recording medium of the present invention has an in-plane coercive force Hc of 1,200 to 3,000 Oe and an Hc/Hk ratio of 0.25 or higher, the magnetic recording medium not only is reduced in self-demagnetization and recording demagnetization to attain stable longitudinal magnetization, but also has an advantage of stronger tendency for vertical-direction magnetization to remain. As a result, stable magnetization is attained in both the longitudinal and the vertical directions and, hence, short-wavelength output is improved. Furthermore, since the magnetic layer has an in-plane orientation ratio of 0.8 or higher, the disk-form magnetic recording medium is reduced in output fluctuations. In addition, since the vertical-direction squareness ratio calculated through diamagnetic correction is less than 0.6, the magnetic layer has no vertical orientation of magnetic particles and this produces the effect of eliminating the distortion of output waveforms.

Consequently, according to the constitution of the present invention, it has become possible to provide a disk-form magnetic recording medium which, as compared with conventional magnetic disks, has been remarkably improved in electromagnetic characteristics, especially in the short-wavelength output necessary to high-density recording which property has long been required of magnetic recording media.

The present invention will be illustrated below in more detail by reference to the following Examples. It will be apparent to one skilled in the art that the ingredients, ingredient proportions, procedures, and the like shown below can be changed or modified without departing from the technical idea of the invention. Therefore the present invention should not be construed as being limited to the following Examples. All parts, percents, ratios and the like are by weight unless otherwise indicated.

EXAMPLES

<Production of Coating Fluids>

Magnetic Coating Fluid X
  Barium ferrite magnetic particles 100 parts
  (molar proportions based on Ba: Fe 9.10%, Co 0.20%, Zn 0.77%)
  Vinyl chloride copolymer 12 parts
  Containing $1\times10^{-4}$ eq/g —SO$_3$Na
  Degree of polymerization: 300
  Polyester polyurethane resin 3 parts
  Neopentyl glycol/caprolactonepolyol/MDI=0.9/2.6/1
  Containing $1\times10^{-4}$ eq/g —SO$_3$Na group
  α-Alumina (particle size, 0.3 µm) 10 parts
  Carbon black (particle size, 80 nm) 10 parts
  Amyl stearate 10 parts
  Stearic acid 2 parts
  Methyl ethyl ketone 125 parts
  Cyclohexanone 125 parts
Nonmagnetic Coating Fluid Y
  Nonmagnetic particles, TiO$_2$ 80 parts
  Crystal system: rutile
  Average primary-particle diameter: 0.035 µm
  BET specific surface area: 40 m$^2$/g
  pH: 7
  TiO$_2$ content: 90% or higher
  DBP absorption: 27–38 g/100 g
  Surface-treating agent: 8 wt % Al$_2$O$_3$
  Carbon black 20 parts
  Average primary-particle diameter: 16 nm
  DBP absorption: 80 ml/100 g
  pH: 8.0
  BET specific surface area: 250 m$^2$/g
  Volatile content: 1.5%
  Vinyl chloride copolymer 12 parts
  Containing $1\times10^{-4}$ eq/g —SO$_3$Na
  Degree of polymerization: 300
  Polyester polyurethane resin 5 parts
  Neopentyl glycol/caprolactonepolyol/MDI=0.9/2.6/1
  Amyl stearate 12 parts
  Stearic acid 3 parts
  Methyl ethyl ketone/cyclohexanone 250 parts (8/2 mixed solvent)

With respect to each of the above two coating fluids, the ingredients were kneaded with a continuous kneader and then dispersed with a sand mill. To the resulting dispersions was added a polyisocyanate in an amount of 3 parts for nonmagnetic coating fluid Y and in an amount of 5 parts for magnetic coating fluid X. The dispersions were filtered through a filter having an average opening diameter of 1 µm. Thus, coating fluid Y for nonmagnetic-layer formation and coating fluid X for magnetic-layer formation were prepared.

A poly(ethylene terephthalate) support having a thickness of 40 µm and a center-line surface roughness of 0.005 µm was coated by simultaneous double coating with nonmagnetic coating fluid Y at a dry thickness of 2 µm and with magnetic coating fluid X at a dry thickness of 0.5 µm. The resulting web was calendered with a 7-roll calender in which all the rolls were metal rolls, at a temperature of 100° C. Thereafter, 3.5-inch disks were punched from the calendered web. Disks which had not undergone orientation treatment had an orientation ratio in any in-plane direction of 0.75, an output modulation of ±14%, and a vertical-direction squareness ratio of 0.62, and gave isolated inversion pulses having an asymmetrical waveform. On the other hand, disks which had undergone random orientation treatment had an orientation ratio in any in-plane direction of 0.90, an output modulation in the range of ±5%, and a vertical-direction squareness ratio of 0.30, and gave isolated inversion pulses having a symmetrical waveform. The disks obtained through random orientation treatment are referred to as sample A-1.

Samples A-2, A-3, and A-4 were obtained in the same manner as in the production of sample A-1, except that the proportion of Zn in the barium ferrite was increased to change the Hc and Hk.

Samples A-5, A-6, A-7, A-8, and A-9 were obtained in the same manner as in the production of sample A-2, except that the proportion of Co in the barium ferrite was reduced and Nb was added so as to make up therefor to change the $H_c$ and $H_k$.

Samples A-10, A-11, and A-12 were obtained in the same manner as in the production of A-2, except that the magnetic-layer thickness in sample A-6 was changed to 0.2 μm, 1.0 μm, and 1.5 μm.

Samples A-13, A-14, and A-15 were obtained in the same manner as in the production of samples A-5, A-6, and A-7, except that the magnetic layer was formed directly on the support without forming a nonmagnetic layer.

COMPARATIVE EXAMPLES

Samples B-1 and B-2 were obtained in the same manner as in the production of sample A-2, except that the proportion of Co in the barium ferrite was increased to reduce the Hk.

Sample B-3 was obtained in the same manner as in the production of sample A-1, except that the proportion of Zn in the barium ferrite was increased to reduce $H_c$.

The evaluation methods used are as follows.

Orientation Ratio

A sample was examined for squareness ratio while rotating the applied magnetic field on the sample from 0° to 360° at an interval of 10°. Orientation ratio was calculated by dividing the minimum squareness ratio by the maximum squareness ratio.

Magnetic Characteristics

Measurements were made in an applied magnetic field of 10 kOe with VSM-5, manufactured by Toei Kogyo Co., Ltd. (Hk)

Using torque magnetometer TRT-2, manufactured by Toei Kogyo Co., Ltd., a demagnetized sample was examined for rotational hysteresis loss Wr from a low intensity of magnetic field to 10 kOe. The values of $W_r$ were plotted against the reciprocal of the intensity of applied magnetic field, 1/H, and the intensity of applied magnetic field at which Wr became 0 on the higher magnetic-intensity side was determined by extrapolating a straight portion of the Wr curve; this intensity was taken as Hk.

Output, C/N

Using floppy disk drive FD-1335D, manufactured by NEC Corp., signals having a wavelength of 0.5 μm were recorded. The recorded signals were reproduced and the output and C/N thereof were measured. The reference disk used was a 4 MB floppy disk manufactured by Fuji Photo Film Co., Ltd.

The results obtained in the Examples and Comparative Examples are shown in Table 1.

TABLE 1

| Sample No. | Hc of magnetic layer (Oe) | Anisotropy field, Hk (Oe) | Hc/Hk | In-plane orientation ratio | Vertical-direction squareness ratio | Thickness of magnetic layer (μm) | Non-magnetic layer | Ouput (dB) | C/N (d/B) | Remarks |
|---|---|---|---|---|---|---|---|---|---|---|
| A-1 | 1200 | 2600 | 0.38 | 0.90 | 0.30 | 0.5 | present | 2.5 | 3.0 | Invention |
| A-2 | 1500 | 4100 | 0.37 | 0.88 | 0.34 | 0.5 | present | 3.5 | 3.9 | Invention |
| A-3 | 2000 | 5200 | 0.38 | 0.86 | 0.40 | 0.5 | present | 4.0 | 4.4 | Invention |
| A-4 | 3000 | 6800 | 0.44 | 0.83 | 0.48 | 0.5 | present | 3.9 | 4.8 | Invention |
| A-5 | 1500 | 5500 | 0.27 | 0.86 | 0.38 | 0.5 | present | 3.0 | 3.2 | Invention |
| A-6 | 1500 | 3700 | 0.41 | 0.90 | 0.31 | 0.5 | present | 3.8 | 4.6 | Invention |
| A-7 | 1500 | 3100 | 0.48 | 0.93 | 0.28 | 0.5 | present | 4.2 | 5.2 | Invention |
| A-8 | 1800 | 3400 | 0.53 | 0.89 | 0.32 | 0.5 | present | 4.4 | 5.7 | Invention |
| A-9 | 2000 | 3300 | 0.61 | 0.91 | 0.35 | 0.5 | present | 4.8 | 6.4 | Invention |
| A-10 | 1500 | 3700 | 0.41 | 0.88 | 0.35 | 0.2 | present | 4.2. | 5.0 | Invention |
| A-11 | 1500 | 3700 | 0.41 | 0.93 | 0.28 | 1.0 | present | 3.5 | 4.3 | Invention |
| A-12 | 1500 | 3700 | 0.41 | 0.95 | 0.25 | 1.5 | present | 2.0 | 2.7 | Invention |
| A-13 | 1500 | 5500 | 0.27 | 0.83 | 0.42 | 0.5 | none | 2.5 | 2.8 | Invention |
| A-14 | 1500 | 3700 | 0.41 | 0.85 | 0.35 | 0.5 | none | 3.1 | 4.0 | Invention |
| A-15 | 1500 | 3100 | 0.48 | 0.89 | 0.32 | 0.5 | none | 3.3 | 4.4 | Invention |
| B-1 | 1500 | 6200 | 0.24 | 0.80 | 0.53 | 0.5 | present | 1.0 | 1.0 | Comparison |
| B-2 | 1500 | 7000 | 0.21 | 0.78 | 0.62 | 0.5 | present | 0.5 | 0.2 | Comparison |
| B-3 | 800 | 2200 | 0.36 | 0.89 | 0.36 | 0.5 | present | 0.7 | 0.9 | Comparison |

The results show that the media according to the present invention had an extremely high short-wavelength output, whereas the conventional media which did not satisfy the essential requirements of the present invention had a low output. The present invention proved to be highly effective.

While the invention has been described in detail and with reference to specific embodiments thereof, it will be apparent to one skilled in the art that various changes and modifications can be made therein without departing from the spirit and scope thereof.

What is claimed is:

1. A disk-form magnetic recording medium comprising a nonmagnetic support having provided thereon at least one magnetic layer comprising a binder and hexagonal ferrite magnetic particles dispersed therein, wherein the magnetic layer has an in-plane coercive force Hc of 1,500 to 3,000 Oe, an Hc/Hk ratio, where Hk is an anisotropy field, of 0.25 or higher, an in-plane orientation ratio of 0.8 or higher, an Hk more than 3,000 Oe, a vertical-direction squareness ratio calculated through diamagnetic correction of about 0.2 to lower than 0.6, and a thickness of 1.0 μm or smaller.

2. The disk-form magnetic recording medium as claimed in claim 1, wherein the Hc/Hk of the magnetic layer is 0.35 or higher.

3. The disk-form magnetic recording medium as claimed in claim 1, wherein the Hc/Hk of the magnetic layer is 0.50 or higher.

* * * * *